(12) United States Patent
Zamir et al.

(10) Patent No.: US 7,912,949 B2
(45) Date of Patent: Mar. 22, 2011

(54) SYSTEMS AND METHODS FOR RECORDING CHANGES TO A DATA STORE AND PROPAGATING CHANGES TO A CLIENT APPLICATION

(76) Inventors: Haim Zamir, Monsey, NY (US); Jerry Dobner, Monsey, NY (US)

( * ) Notice: Subject to any disclaimer, the term of this patent is extended or adjusted under 35 U.S.C. 154(b) by 137 days.

(21) Appl. No.: 12/166,452

(22) Filed: Jul. 2, 2008

(65) Prior Publication Data

US 2010/0005134 A1 Jan. 7, 2010

(51) Int. Cl.
*G06F 15/173* (2006.01)
*G06F 15/16* (2006.01)
(52) U.S. Cl. .................... 709/224; 709/203; 709/236
(58) Field of Classification Search .......... 709/203, 709/236, 224
See application file for complete search history.

(56) References Cited

U.S. PATENT DOCUMENTS

| 6,321,212 B1 * | 11/2001 | Lange ................... 705/36 R |
| 2005/0033680 A1 * | 2/2005 | Shibusawa ................ 705/37 |
| 2008/0163202 A1 * | 7/2008 | Kembel et al. ............. 717/178 |

\* cited by examiner

*Primary Examiner* — Phuoc Nguyen
*Assistant Examiner* — Asghar Bilgrami (57) ABSTRACT

Systems, methods and consumer-readable media for recording changes to a data store and propagating changes to client application. A method according to the invention may include categorizing data into a set of sub-records based on the frequency of change of the data. The method may also include transmitting sub-records of data having a first change frequency to a client application using a latest update process; and transmitting sub-records of data having a second change frequency to a client application using an event sequence process.

31 Claims, 6 Drawing Sheets

Energy Match

| Product | Period | BCst | BSz | Bid | Ofr | OSz | OCst | BSz | Bid | Ofr | OSz | Last |
|---|---|---|---|---|---|---|---|---|---|---|---|---|
| PAN - BS | Apr08 | _Dave.. | 2500 | 1.1700 | -1.1650 | 10000 | _Scott... | | | | | L-1.1600 |
| PAN - BS | Aug08 | _Scott... | 10000 | -1.0700 | | | | | | | | |
| PAN - BS | Sep08 | _Scott... | 10000 | -1.2500 | -1.2400 | 10000 | _Gayla... | | | | | |
| PAN - BS | Oct08 | _Shaw... | 10000 | -1.4500 | | | | | | | | |
| PAN - BS | Q2 08 | _Andre... | 10000 | -1.1600 | | | | | | | | |
| PAN - BS | Q3 08 | _Gayla... | 10000 | -1.1300 | -1.1150 | | | | 1.1150 | | | |
| PAN - BS | Apr-Oct.. | _Scott... | 10000 | -1.1900 | -1.1650 | | | | | 1.1650 | | |
| PAN - BS | Nov08... | _Gayla... | 10000 | -1.3200 | -1.3200 | | | | | 1.3200 | | H 1.3250 |
| PAN - BS | Apr-Oct.. | | | -1.0500 | -0.9750 | 10000 | _Paul Fi.. | | -1.0... | | | |
| PAN - BS | Apr-Oct.. | _Andre... | 10000 | -1.0900 | -1.0500 | 10000 | _Andre... | | | | | |
| PAN - BS | Nov10... | _Andre... | 10000 | -1.8900 | -0.8600 | 10000 | _Paul Fi.. | | | | | |
| PAN - BS | Cal12 | | | -1.3200 | -0.6800 | 10000 | _Paul R... | | | | | |

Market Activity —532

- 13:19:53 EDT HSC-BS(Apr-Oct08) _Mark Wile Broker buys 10000 MMBtu/d @ -10.19 from _Adam March Broker
- 12:25:57 EDT HSC-BS(Apr-Oct08) _Adam March Broker sells 10000 MMBtu/d @ -10.19 from _Mark Wile Broker
- 11:27:42 EDT PAN -BS(Apr08) _Mark Wile Broker buys 10000 MMBtu/d @ -1.16 from _Brian Leech Broker
- 10:40:46 EDT ROX-BS(May08) _Brett Doolittle Broker

My Activity —534

- 14:21:14.824 Connection State: Connected
- 14:21:14.940 Connection State: Syncing
- 14:21:06:824 Connection State: Loading

SYSTEMS AND METHODS FOR RECORDING CHANGES TO A DATA STORE AND PROPAGATING CHANGES TO A CLIENT APPLICATION

FIELD OF TECHNOLOGY

The present invention relates to software processes for capturing, disseminating and reconstituting state information from server to a client application.

BACKGROUND

A significant class of applications is built around a server that maintains a master state of information. All or a portion of this master state of information is propagated to clients, based on subscription. One critical property of the class of applications is that—at any given time—preferably all connected clients are in agreement as to the latest server-maintained state.

One classic example of such an application is a trading system, where a central server maintains the state of a market, and makes that information available to both active participants and passive observers.

Accordingly, it would be desirable to provide systems and methods that maintain state information in a central server.

It would be further desirable to provide systems and methods that propagate state information to a plurality of connected clients.

It would be still further desirable to provide systems and methods that reconstitute state information at a client, the state information being maintained at a central server.

SUMMARY OF THE INVENTION

It is an object of this invention to provide systems and methods that maintain state information in a central server.

It is a further object of this invention to provide systems and methods that propagate state information to a plurality of connected clients.

It is a still further object of this invention to provide systems and methods that reconstitute state information at a client, the state information being maintained at a central server.

A method according to the invention may include selecting a mechanism to report a data object to a client. The mechanism may be selected from one of an event sequence mechanism and a latest update mechanism. When the latest update mechanism is selected to report the data object to the client, then the method may include grouping a plurality of data objects for reporting to the client based on a first characteristic associated with the changing of the plurality of data objects.

In certain embodiments of the invention, a first set of records may include data fields that are grouped based on a first data characteristic. For example, a first set of records may include bids and offers and other such data. It should be noted that the selection of the first set of records may be refined—i.e., further limited—to a grouping of data based on, for example, frequency of change of those fields. Alternatively, the fields may be grouped based only on the selection of data according to the first characteristic and not based on the frequency of change of fields.

In yet another embodiment of the invention, the fields may be grouped based on the first characteristic in combination with one or more predetermined characteristics. Such a first characteristic may include the tendency of certain data fields to change together. Such a first characteristic may include a statistical analysis of the data to be transmitted, or like data that has already been transmitted, in order to obtain sub-records that allow a reduced bandwidth for transmission.

For the purposes of this application, frequency of change of data fields may be defined as the number of changes of data per unit time. In other embodiments of the invention, fields may be grouped according to a tendency of the data to change substantially simultaneously.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

In the following description of the various embodiments, reference is made to the accompanying drawings, which form a part hereof, and in which is shown by way of illustration, various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

A method for recording changes to a data store in a state machine and propagating those changes to client applications is provided. An introduction to conventional methods of propagating state changes from the client to the server follows.

I. Server Transmission of Events in Sequence as the Events Occur—i.e., Event Sequence Reporting After, or in conjunction with, establishing a known state with the client, such as a snapshot, the server may stream to the client a sequence of events describing subsequent incremental changes to the state of the system as those changes occur. This is a common and generally applicable pattern for updating client applications. One benefit of such a process is simplicity.

The most serious drawbacks to sequential event reporting are the limited connection bandwidth that typically exists between the server and the client and the processing power of clients. For example: in reporting market data—particularly at high-volume, peak periods—the streamed data cannot be sufficiently compressed to fit the available bandwidth. Furthermore, the client cannot apply the state changes fast enough to keep up with the current market, causing both a data transmission backlog and overtaxing of the client machine. Often this second problem of overtaxing the client machine is compounded because the client machine is not necessarily dedicated to the single task of consuming the market data.

II. Server Transmission of Latest Update Changes

A latest update mechanism (alternatively referred to herein as a latest update method, system or process) may provide information only about the current state of the system, or relevant set of changes to the system, either when the client asks for this information or at appropriate intervals. The benefit of a latest update approach is that a great many changes to the server state effectively cancel or supersede prior changes, making it ultimately unnecessary to propagate every change to the client. By the time the client is prepared to consume more information, several of the server state changes may have been superseded by subsequent changes.

A drawback to the latest update mechanism is that it is insufficiently general; it typically cannot provide information about event order as required for certain classes of information. Accordingly, this method of updating a client confines exclusive use of the latest update mechanism to special purpose uses.

In contrast, the method according to the invention may include segregation of changes to the state information in the server into event-sequence type changes and latest-update type changes. The method may also include further segregation of latest-update changes into sub-records based on a change characteristic—e.g., frequency of change or tendency of certain data objects to change together. The method may also include storage of latest-update changes in a random access map that also tracks the order of entries as they are modified, combining the tracking random access map with an event queue into a comprehensive publisher/notifier component—i.e., a component that publishes a set of changes to the proxy state within the server, and notifies one or more observer components (each of whom export from the proxy state preferably all events and changes to map records), packaging all imported data into a format directly consumable by the client as a complex data structure, and triggering graphical rendition of preferably only currently-observed records.

The method may also include throttling of data rates in accordance with limits of human observable changes and/or server/client performance considerations. Moreover, the method may guarantee that the latest available server data is observable by the client. A system for carrying out the method is also described and claimed. The system has (non-exclusive) applicability to market data and trading systems. Applications of a system according to the invention may include, among others, a real-time monitoring system for medical conditions, or monitoring of the operational state of manufacturing equipment.

As described above, the invention includes a method of maintaining, propagating, and/or reconstituting state information. Components of one embodiment of a data transfer mechanism according to the invention may include a server side component, a transport component, and a client side component. In certain embodiments of the invention, the information being transferred according to the invention is sufficiently compact to fit within network bandwidth regardless of network load. Furthermore, the information is preferably quickly consumable, without taxing local resources. In addition, wasted processing of obsolete information is minimized, as will be explained in more detail below.

One embodiment of a method in accordance with the principles of the invention preferably integrates the event-sequence approach and latest-update approach into a single, preferably unified, approach to data maintenance, propagation and state reconstitution. In this embodiment of the invention, a particular class of changes is provided on demand at a refresh rate that is determined by the ability of the client to consume the information. Other classes of changes that are of lower frequency can be sent as events in sequence.

Figure 1:
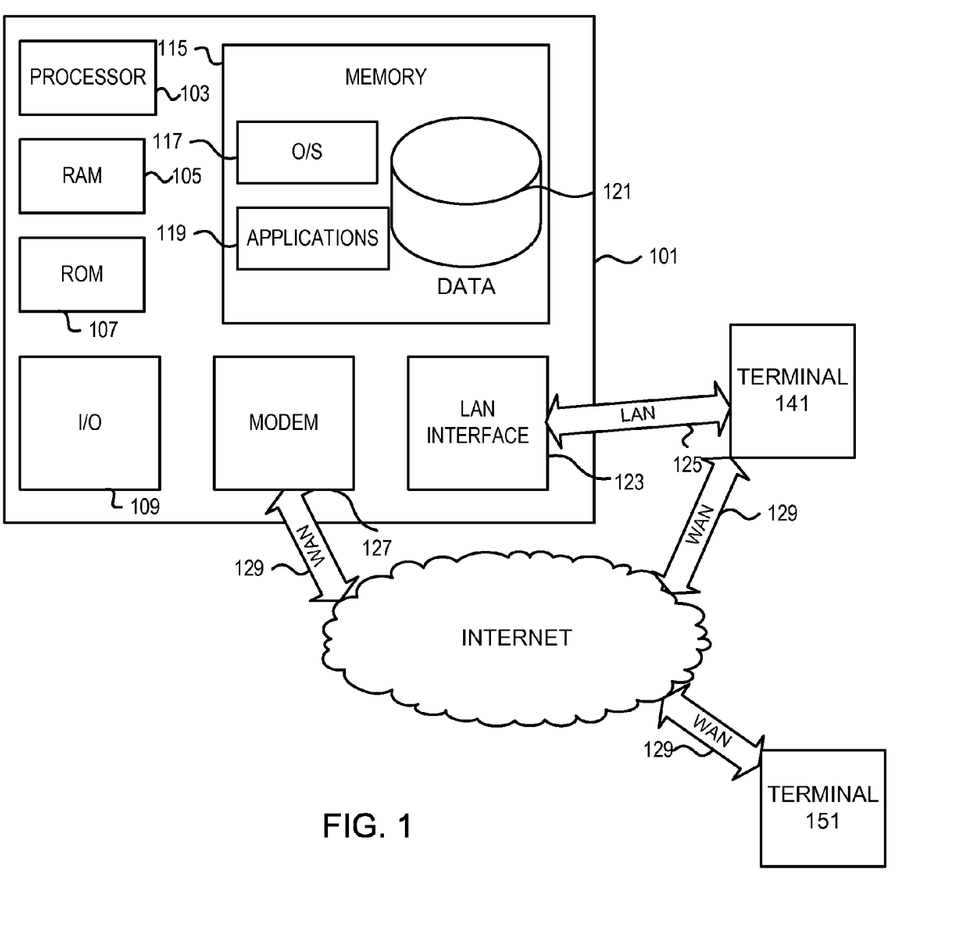
FIG. 1 illustrates a schematic diagram of a general-purpose digital computing environment in which one or more aspects of the present invention may be implemented.

FIG. 1 illustrates a block diagram of a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115.

I/O module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 121. Alternatively, some or all of server 101 computer executable instructions may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119 used by server 101 according to an illustrative embodiment of the invention may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

As described above, one factor that limits the transfer of information from the server to the client is that the client-side component of a system according to the invention is typically a general purpose web browser, or one application among many running on the client machine. The client machine is typically not solely dedicated to serving the client-server relationship of the invention. Rather, the client machine may provide numerous services in addition to providing the client access to the state propagated by the server. Accordingly, the access to resources by the client-side component is limited—the server cannot overuse resources provided by the client machine.

One possible solution according to the invention may be to consolidate the data—i.e., reduce the amount of data being transferred. One way to consolidate the data is by using a polling system—i.e., the client only receives data when the client "polls" or requests the data. In such a system, the amount of data being transferred is limited by the client's requests and, consequently, the client's ability to consume the data.

Figure 2:
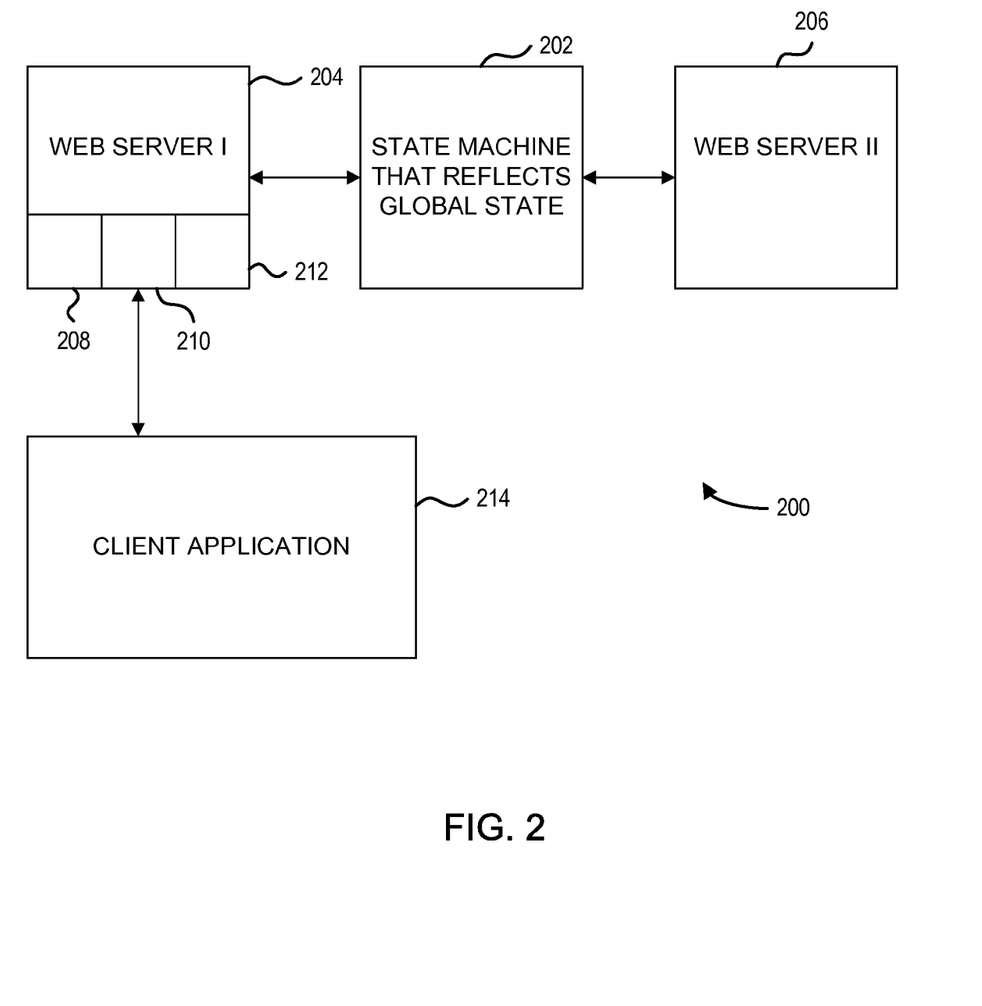
FIG. 2 shows a schematic diagram of a system that may provide a platform for implementing a method according to the invention.

FIG. 2 shows a schematic diagram of a system 200 that may provide a platform for implementing a method according to the invention. System 200 includes an exemplary application server 202 that may include a state machine that reflects the global state of the architecture. Typically, the state machine 202 propagates state changes to exemplary web servers 204 and 206.

Each of web servers 204 and 206 may include proxies 208, 210, and 212, that each provides a snapshot (alternatively referred to herein as a "session") of the state of the client. The snapshot or, alternatively, other relevant information, on exemplary proxies 208, 210, and 212 may be transmitted to application server 202 and be used by application server 202 as needed to update the global state. Thus, web servers 204 and 206 act as interfaces between application 214 and web server 202.

Though the state information on the client application 214 typically mirrors the information on its respective proxy 210, nevertheless, the proxies change more rapidly than the actual information on the client application 214. The information exchanged between exemplary proxy 210 and client application 214 may be throttled based on a client and/or server performance ceiling, and/or floor, or some other suitable throttling factor.

A ceiling may indicate a maximum transfer rate of information between the server and the client. Above the ceiling, the system does not deliver any additional updates. The floor may provoke a token message indicating that the system is alive but no information is available for transfer.

In certain embodiments of the invention, the ceiling may be temporarily removed for selected events. The removal of the ceiling may be implemented such that a user who inputs data perceives a higher level of system performance with respect to the data input, or, in alternative embodiments, with respect to the operation of the entire system. Such selected events may include client-initiated market orders where the client expects the order to be substantially immediately reflected by his client application.

An additional factor of the throttling is a dependency on the polling of the client. In a polling-type system, the information may be further throttled by the rate of client requests.

As described above, an event sequence system, unlike a latest update system, transmits information about a change as an event every time a relevant—i.e., worthy of transmission—change occurs. The latest update system, which may incorporate a throttled streaming or polling process, does not necessarily update in response to each discrete change, but rather can provide a snapshot of the changes to an entire data set (such as the changes to a market) that occurred between two points in time. The same information—i.e., the changes to an entire data set—may be too large to process efficiently in an event sequence system.

A process according to the invention may transmit to the client application certain data via a latest update system and certain data via an event sequence system. By appropriately selecting which data types of data—e.g., changes to existing values—should be sent using the latest update system and which types of data should be sent using the event sequence system, factors limiting the transfer of information to the client may be substantially mitigated.

Examples of data that may be sent in a latest update system are bids and offers data in a market environment. This data should preferably be provided while substantially relevant. Thus, bids and offers data should preferably be transmitted using a latest update method which, when required, will skip or omit certain data in order to provide the most current data.

Other data may preferably be provided to the user using the event sequence system. Such other data may include a trade record of trades made on a specific instrument. A user action list—i.e., a confirmation of a trader's own actions—may also be sent using the latest event sequence system.

Figure 3:
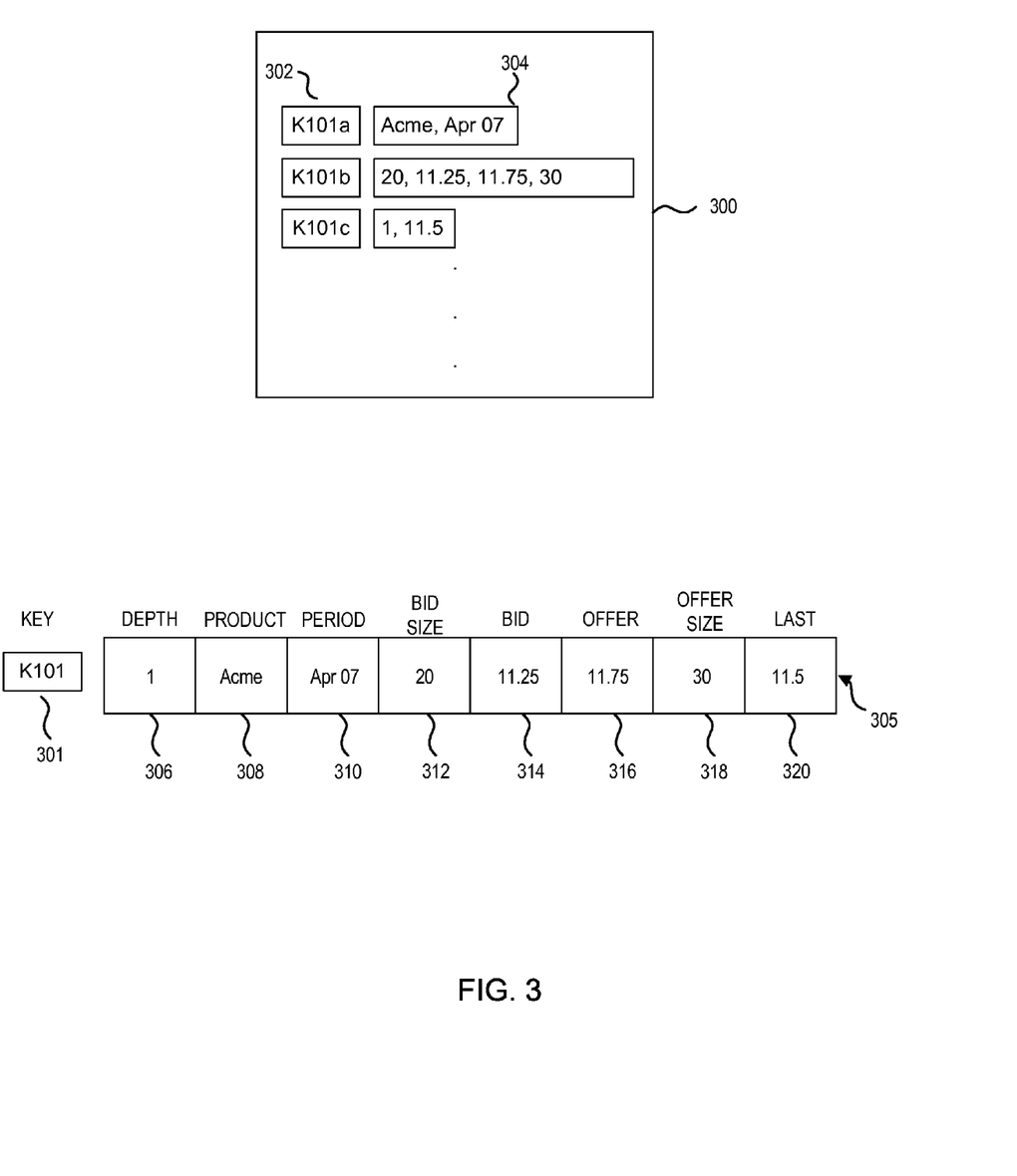
FIG. 3 shows an exemplary data structure that may be transmitted according to the invention.

FIG. 3 shows an exemplary data structure 305 representing a single financial instrument. It includes a number of fields 306-320 that contain values. Each of the fields may be associated with some aspect of a financial instrument, known to the system by a logical key 301. Such values may include the depth 306 of the market for the instrument—i.e., the existence and price of other than the best bid and the best offer for the instrument—the time period 310 associated with the financial instrument contract, the bid size 312, the bid price 314, the offer price 316, and the offer size 318, and the last traded price 320.

Data structure 300 shows single logical record 305 as it may have been broken down into sub-records with corresponding sub-keys (K101a, K101b, K101c . . . ) 302; each of the keys that corresponds to a subset of fields 304 (hereinafter referred to as a "sub-record"). The values are represented as fields in record 305. Data structure 300 represents a repository of latest information maintained in the web server in a session on behalf of a client application.

In certain embodiments of the invention, typically all of the fields in record 305 may be sent using a latest update system or process. These fields can be sent at the rate—i.e., amount of information per unit time—that the client can consume regardless of whether the information is delivered in chronological order.

In certain embodiments of the invention, different groups of fields in the record 305 may change at different rates. For example, fields for bid 314 and offer 316 may change relatively more frequently than the other fields. Accordingly, one embodiment of the invention may preferably assign multiple fields to a given key-accessible sub-record based on a characteristic of the change of the fields.

Grouping fields by frequency of change (or other suitable characteristic) obviates the need for naming each and every individual field. One feature of this grouping may include referring to each field by position within a sub-record. This grouping reduces processing overhead associated with transmitting each and every field, transmission bandwidth, and memory use at the client.

Certain embodiments of the invention may incorporate heterogeneous record types, each with its own possible division into sub-records, distinguished by clients as a property of its keys or distinguished by some other method. In certain embodiments of the invention, some records may act as masters containing the only copy of sub-records whose contents are shared by dependent records.

Certain embodiments of the invention may employ static decomposition of logical records into sub-records according to a schema known to both server and client. Other embodiments of the invention may utilize a component that provides the server with statistical analysis of the output data which may be used to reorganize the output data to obtain a reduced bandwidth output. Specifically, this reduced bandwidth output may be obtained by reorganizing the fields into different sub-records, and propagating events describing this new organization of sub-records to the client.

In certain data processing systems according to the invention, such as systems which provide prices for market data, the systems may both store and modify records, possible broken down as sub-records in a data structure that combines the properties of both a random access map and an ordered list. Every time a price, or other suitable piece of information, changes, the relevant records are accessed by key, modified, and moved to the top of the list.

Figure 4:
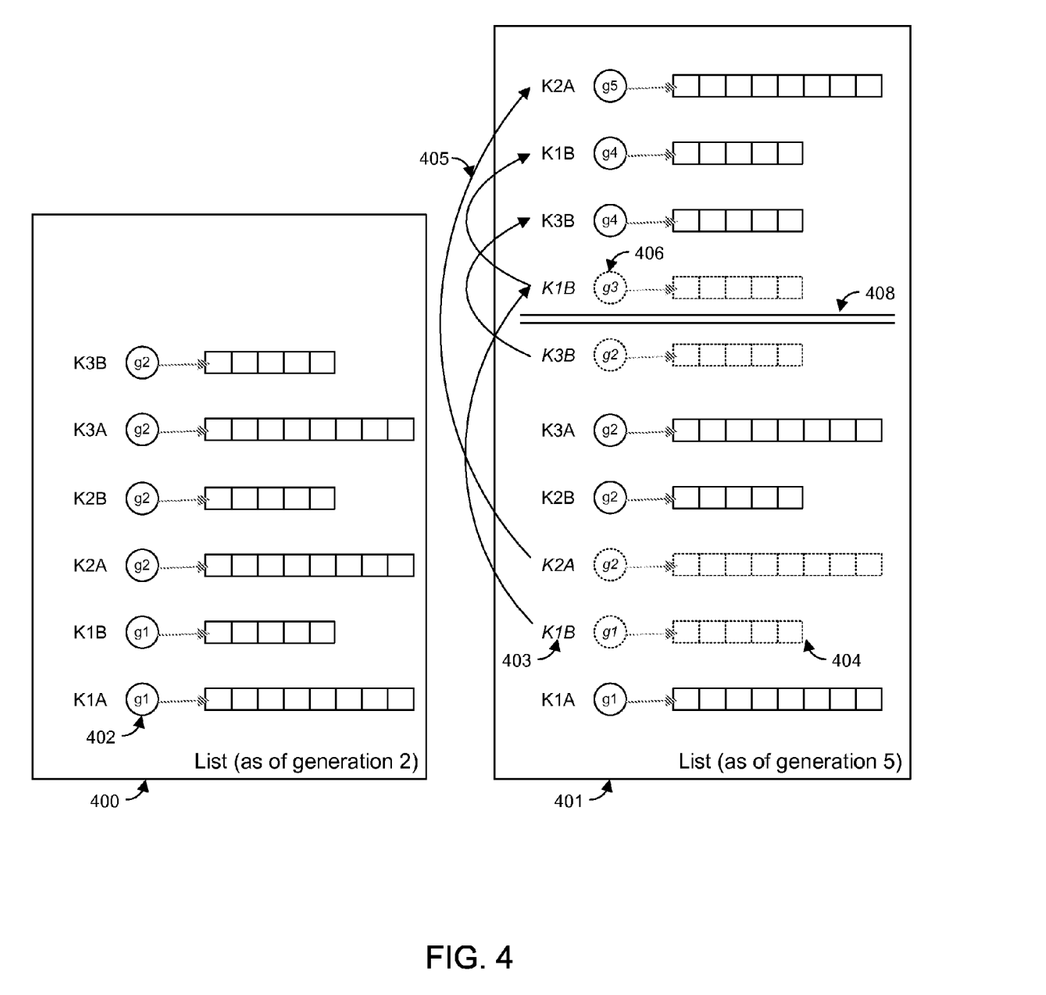
FIG. 4 shows a map of data which may be used in processes according to the invention.

FIG. 4 shows the list aspect of a tracking map/list of records. Two versions of the list are shown 400 and 401, representing the state of the list at two points in time, known as "generation 2" and "generation 5" respectively. Each node 402 contains or refers to a sub-record. Each node preferably is associated with a number—"a generational identifier" that serves as an index marker. When a sub-record 404 is updated—i.e., a newer version of the data contained in the sub-record is available to be propagated—then the new piece of information fills the place of the historic piece of information.

The corresponding node is first accessed, preferably by key 403. It is moved to the top of the list 405. The corresponding sub-record is modified. The node or sub-record is assigned a new number. As such, the new piece of information is assigned the most recent number. All steps subsequent to locating the node may be performed in any order. The diagram of the list 401 shows the net effect of four modifications made in the course of three update cycles (generations 3 through 5). It should be noted that the sub-record denoted by key K1B has been modified twice in succession in update cycles (generations) 3 and 4. It should be noted further that the sub-record denoted by key K1B has also been modified during update 4, and a final modification to sub-record K2A has been made during update 5. Nodes/sub-records drawn in dotted outline show former positions of nodes in the list.

When a client requests the list of sub-records, he may request a list including all data from a particular point in time forward. The particular point from which the client is requesting data is typically identified by one of the numbers—i.e., generational identifiers—that is associated with each sub-record. The next time a client requests information, he typically requests all information that has been updated since his last request. Thus, if his previous request retrieved sub-records up to and including generation identifier 2, his next request will retrieve all information updated based on sub-records from identifiers later than 2 in the sequence of generational identifiers (which could either be counting up or counting down, depending on the preselected direction of counting of generational identifiers.)

FIG. 4 further shows at 406 the superseded modification of sub-record K1B which shows that the generational identifier 3 has been replaced by subsequent modification to generation 4. Accordingly, no trace of generation 3 remains due to subsequent modifications.

Line 408 schematically indicates that all still-extant sub-records above line 408 are effectively requested by a client by virtue of their assignment to a generation greater than 2. As stated above, the version of the sub-record associated with generational identifier 3 has not been retrieved because it has already been overwritten or replaced in a suitable manner by the sub-record associated with generational identifier 4 at the time of retrieval. It should be noted further that the values returned at the time of a retrieval represent preferably only those sub-records that contain values that have been changed. Typically, any sub-record at the client side that is not included in the retrieval will remain unchanged. Thus, the retrieval provides a "continuous snapshot" of only the sub-records that have changed.

In the event of a disconnection between the client and the data source, the process heretofore described may, upon reconnection, quickly deliver only the data that has changed since the last client update, thereby obviating the need for large resource overhead at the time of reconnection. It has been shown from the foregoing that, in certain embodiments of the invention, the server side provides a writing capability regarding the information that is stored therein.

In addition to the map 400 shown in FIG. 4, there may be another compilation of the data in the form of a queue(s). In contrast to the map, which contains only the currently relevant data, a queue may include events describing the sequence of changes as they occurred. Thus, in the foregoing example, all the information will be included in its proper sequence and no version of information will be missing, as opposed to the parallel case in FIG. 4 where the update cycle 406 of generation 3 has been superseded. It can be understood that information that uses the latest update process may be provided using the map while information that uses the event sequence process may be provided using the event sequence process. Alternating queues may be used to avoid queue contention.

In a "bursty" information situation—i.e., a situation such as a volatile market wherein the information may be provided at an uneven rate, and, at times, in large volume—the information may be produced at the server at a rate that is faster than clients can consume. This problem may be mitigated using systems according to the invention such as the latest update system.

The latest update system may be used with the map 400 shown in FIG. 4. Map 401 mitigates the problem of bursty information because the client is only seeing prices or other latest update information without seeing the sequence of change. In a conventional system, on the other hand, when the rate of the information produced at the server exceeds the client's rate of consumption, the server-side buffer must grow in line with the growth of information it is storing, yet not transmitting. Even then, the ultimate resolution of the backlog is done at the expense of transmitting no-longer relevant information and unwarranted consumption of client-side resources.

Other aspects of the invention may relate to a notifier function at the server. For example, when a generational identifier of a particular record changes, the server may notify one or more observant client proxies. Thus, every time something in the map changes, the client proxy is informed that an update has taken place. In certain embodiments, where the notifier has not informed the client proxy that updated information exists, the client may be blocked from retrieving additional information aside from possible periodic token messages.

In one embodiment of the invention, all the sub-records of information may be integrated into a single logical record at the client side. As such, client side processing has preferably been used to reduce the drain on transmission resources such as bandwidth between the web server and the client.

When a client requests information, he may obtain a sub-record such as the following sub-record:

['b',1,' ',111.0,'<span class=\"\good">100</span>', '<span class=\"good\">111.0</span>','12044','b', 'zTest 2', ' ', 'fppo',' ']

The terms in the sub-record may represent the following: 'b'-subrecordID, '1'-recordID, ' '-formatted size, '111.0'-formatted price, '<span class=\"good\">100</span>'-status of a user's credit with respect to a counterparty providing an active bid (also includes a style class to visually indicate the value depending on the content—e.g., green indication accompanies satisfactory credit, red indication accompanies no credit), '<spanclass=\"good\">111.0</span>'-status of counterparty's credit with respect to a user providing an active offer, '12044'-Order ID, 'zTest2'-company on bid, '_', 'fppo', '_'-assorted flags. This sub-record is only one exemplary embodiment of a sub-record that may be transmitted according to the invention.

Such a sub-record may include a built-in mark-up language that directs the client how to render the data. While such a sub-record structure may be more weighty to transmit, nevertheless, the loss due to additional bandwidth may be more than compensated by the reduction in client-side processing resources.

Figure 5:
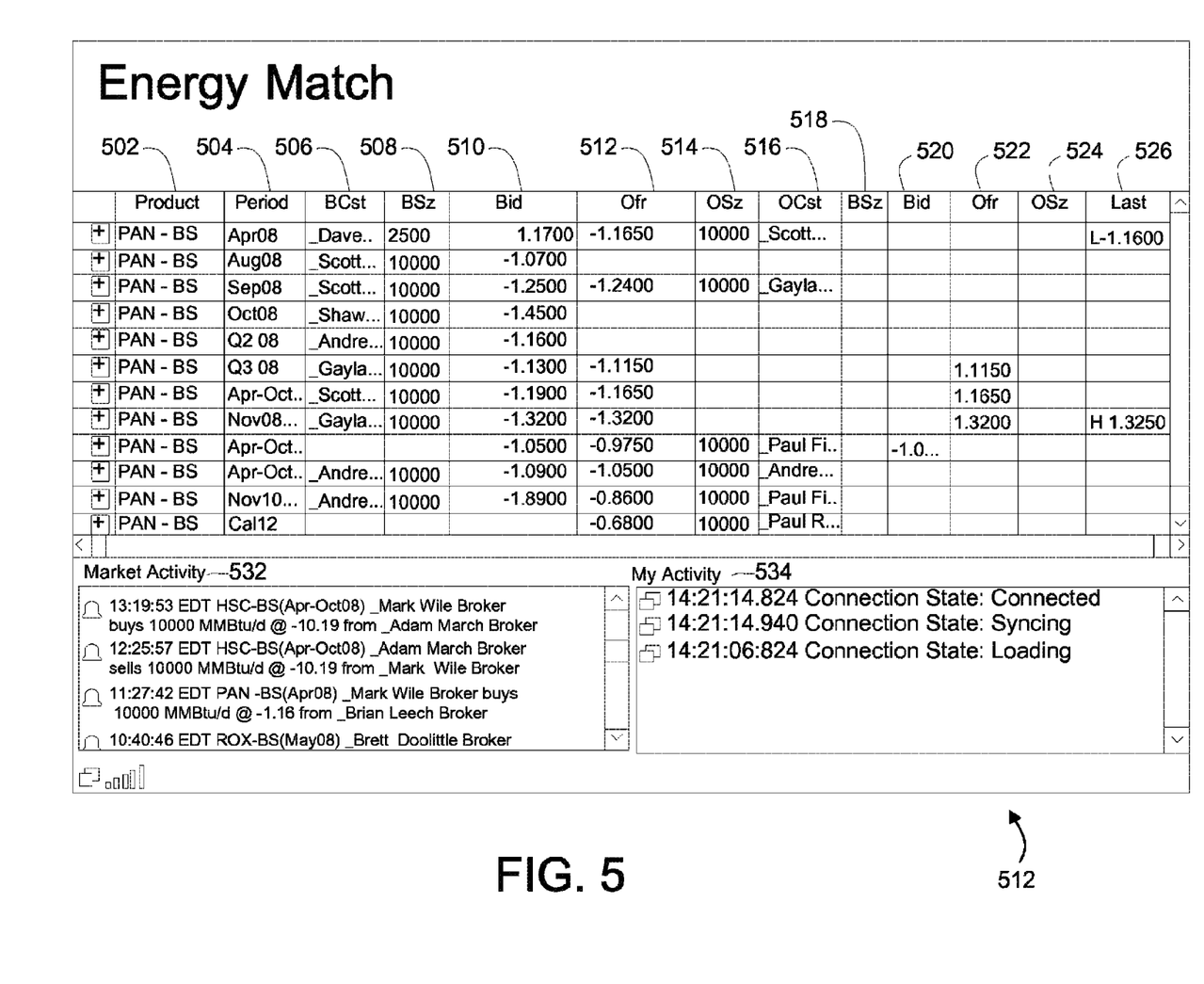
FIG. 5 shows a screen shot of a display according to the invention.

FIG. 5 shows a display screen 500 for use with a system according to the invention. Display screen 500 includes the financial product 502 and the time period 504 combining to describe a financial instrument, the bidder identifier 506, the bid size 508, the bid price 510, the offer price 512, the offer size 514, the offer identifier 516, user-associated bid size 518, user-associated bid 520, user associated offer 522, user associated offer size 524, and the last traded price 526.

In certain embodiments of the invention, sub-records of high change frequency items may include the bid size 508 and price 510; the offer price 512 and size 514. On the other hand a sub-record of relatively lower change frequency item may include user-associated bid size 518, user-associated bid 520, user associated offer 522, user associated offer size 524. Even more rarely changing fields such as the financial product 502 and time period 504 describing the instrument itself may include a relatively stable sub-record of its own. While each of these sub-records may be transmitted via a latest update process, nevertheless, the sub-records with a higher frequency of change may be sent more often. By grouping the sub-records according to change behavior, bandwidth is conserved.

The area showing market activity 532 may preferably include market information that has been transmitted in an event sequence process. In addition, the area showing "my activity" 534 may also include market information as transmitted in an event sequence process in order to maintain the sequence of the information.

Preferably, the trigger mechanism for displaying the graphical rendition of display screen 500 causes the display of preferably only currently observed records. As such, the client side resource overhead is reduced.

Figure 6:
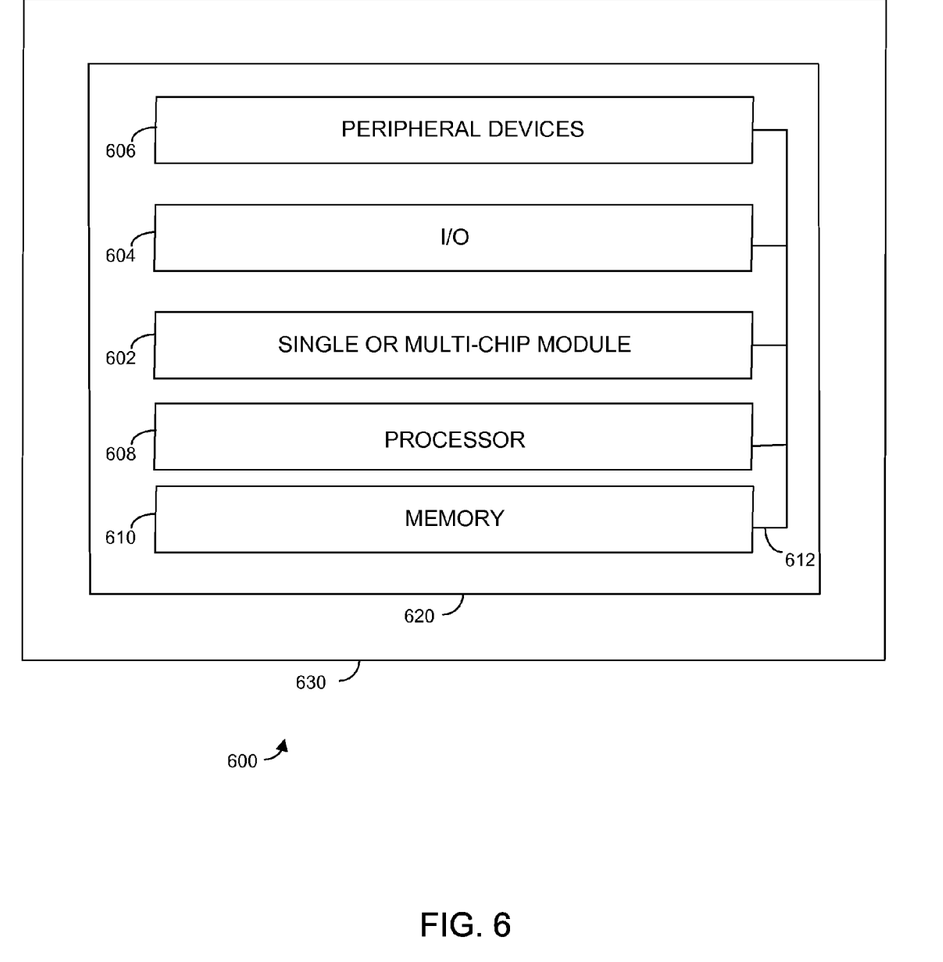
FIG. 6 shows a schematic diagram of an illustrative single or multi-chip module of this invention in a data processing system.

FIG. 6 shows a schematic diagram of an illustrative single or multi-chip module of this invention in a data processing system. Device 600 may include single or multi-chip module 602, which can be one or more integrated circuits, and which may include logic configured to: perform mathematical operations on signals representing signal noise power or to perform any other suitable logical operations. Device 604 may include one or more of the following components: I/O circuitry 604, which may interface with coaxial cable, telephone lines, wireless devices, output devices, a keypad/display control device or any other suitable media or devices; peripheral devices 606, which may include counter timers, real-time timers, power-on reset generators or any other suitable peripheral devices; processor 608, which may control process flow; and memory 610. Components 602, 604, 606, 608 and 610 may be coupled by a system bus or other interconnections 612 and may be present on one or more circuit boards such as 620. In some embodiments, the components may be integrated into a single chip 650.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order, and that one or more steps illustrated may be optional, and that one or more steps may be substituted with functionally equivalent steps that are not precisely as described herein. The methods and systems of the above-referenced embodiments may also include other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for maintaining, propagating, and reconstituting state information according to the invention have been provided. Persons skilled in the art will appreciate that the present invention can be practiced by other than the described embodiments, which are presented for purposes of illustration rather than of limitation, and the present invention is limited only by the claims which follow.

What is claimed is:

1. A method comprising: selecting a mechanism to report a data object to a client, said mechanism being selected from one of an event sequence mechanism and a latest update mechanism;
when said latest update mechanism has been selected, then: receiving data from a data provider; grouping data into sub-records based on the frequency of change of the data; transmitting sub-records of data having a first change frequency to a client application using the latest update mechanism; and
when said event sequence mechanism has been selected, then: receiving data from a data provider; transmitting sub-records of data having a second change frequency to a client application using the event sequence mechanism; wherein: the event sequence mechanism updates the client application by transmitting from the data provider a sequence of events describing subsequent incremental changes to a system state as the changes occur; and the latest update mechanism updates the client application by transmitting from the data provider only a current state of the system; limiting the rate of information transfer to the client; wherein limiting the rate of information transfer to the client further comprising temporarily removing the limitation on the rate of information transfer to the client when the transfer includes client-initiated state change.

2. The method of claim 1 further comprising receiving the sub-records of data at a client;
assembling related sub-records into a session; and
displaying the session on a client display.

3. The method of claim 2, the displaying the session on a client display further comprising triggering graphical rendition of only currently observed records.

4. The method of claim 1, wherein the first change frequency comprises sub-records of data having a relatively high change frequency.

5. The method of claim 1, wherein the second change frequency comprises a relatively low change frequency.

6. The method of claim 1, wherein the first change frequency is higher than the second change frequency.

7. The method of claim 1, further comprising notifying a client proxy when information in the first set of sub-records has been updated.

8. The method of claim 1 further comprising delaying a response to a client request for data changes until an update is available.

9. The method of claim 1 further comprising, following a disconnection of the client, reconstituting a state of client data by transmitting latest update data to the client.

10. The method of claim 1 further comprising reintegrating sub-records into their corresponding logical records at the client application.

11. A method comprising: categorizing data into a set of sub-records based on the frequency of change of the data; transmitting at least one sub-record of data having a first change frequency to a client application using the latest update mechanism; and transmitting at least one sub-record of data having a second change frequency to a client application using the event sequence mechanism; wherein: the event sequence mechanism updates the client application by transmitting from the data provider a sequence of events describing subsequent incremental changes to a system state as the changes occur; and the latest update mechanism updates the client application by transmitting from the data provider only a current state of the system; limiting the rate of information transfer to the client; wherein limiting the rate of information transfer to the client further comprising temporarily removing the limitation on the rate of information transfer to the client when the transfer includes client-initiated state change.

12. The method of claim 11 further comprising receiving the sub-records of data at a client;
assembling related sub-records into a session; and
displaying the session on a client display.

13. The method of claim 12, further comprising displaying the session on a client display triggering graphical rendition of the session only currently observed records.

14. The method of claim 11, wherein the sub-records of data having a first change frequency comprising sub-records of data having a relatively high change frequency.

15. The method of claim 11, wherein the sub-records of data having a second change frequency comprising sub-records of data having a relatively low change frequency.

16. The method of claim 11, wherein the first change frequency is higher than the second change frequency.

17. The method of claim 11 further comprising notifying a client proxy when an update to information included in the sub-records having the first change frequency has been updated.

18. The method of claim 11 further comprising blocking the client from requesting information until an update to the information in either the sub-record having the first change frequency of the sub-record having the second change frequency has occurred.

19. The method of claim 11 further comprising, following a disconnection of the client, reconstituting a state of client data by transmitting latest update data to the client.

20. The method of claim 11, the transmitting further comprising transmitting using a latest update process.

21. A system for recording changes to a data store and propagating changes to a client application, the system comprising: an application server comprising a global state of data; a web server comprising a session reflective of a state of data at a client application, the web server that interfaces between the application server and the client application; an event sequence mechanism, the event sequence mechanism propagating changes to the client application by transmitting from the data provider a sequence of events describing subsequent incremental changes to a system state as the changes occur; a latest update mechanism, the latest update mechanism propagating changes to the client application by transmitting from the data provider only a current state of the system; and wherein the web server transmits a first plurality of state data to the client application using the latest update mechanism and a second plurality of state data to the client application using the event sequence mechanism; and wherein the system is configured to limit the rate of information transfer to the client; the limiting the rate of information transfer to the client further comprising temporarily removing the limitation on the rate of information transfer to the client when the transfer includes client-initiated state change.

22. The system of claim 21 wherein the application server is configured to trigger a client display of only currently observed records.

23. The system of claim 21, the first plurality of state data having a relatively higher change frequency than the second plurality of state data.

24. The system of claim 21, wherein the first plurality of state data comprises a first change frequency and the second plurality of state data comprises a second change frequency, the first change frequency being different from the second change frequency.

25. The system of claim 21 further comprising a notifier module for notifying the client application when an update to information included in the first plurality of state data or the second plurality of state data has been updated.

26. The system of claim 21, wherein the first plurality of state data comprises data that is selected based on a first data characteristic.

27. A non-transitory computer-readable medium storing computer executable instructions which, when executed by a processor on a computer system, perform a method comprising: using the processor to select selecting a mechanism to report a data object to a client, said mechanism being selected from one of an event sequence mechanism and a latest update mechanism; and when the latest update mechanism is selected to report the data object to the client, using the processor device to group a plurality of data objects for reporting to the client based on a first characteristic associated with the plurality of data objects; wherein: the event sequence mechanism updates the client application by transmitting from the data provider a sequence of events describing subsequent incremental changes to a system state as the changes occur; and the latest update mechanism updates the client application by transmitting from the data provider only a current state of the system; limiting the rate of information transfer to the client; wherein limiting the rate of information transfer to the client further comprising temporarily removing the limitation on the rate of information transfer to the client when the transfer includes client-initiated state change.

28. The method of claim 27 further comprising triggering graphical rendition at the client of only currently-observed records.

29. The method of claim 27 wherein the first characteristic associated with the changing of the plurality of data objects includes frequency of change of the plurality of data objects.

30. The method of claim 27 wherein the first characteristic associated with the change of the plurality of data objects includes tendency of selected data objects to change together.

31. The method of claim 27 wherein the first characteristic includes a characteristic obtained by a statistical analysis of the data, said statistical analysis that obtains a reduced bandwidth output.

* * * * *